(12) United States Patent
Millot

(10) Patent No.: US 11,061,249 B2
(45) Date of Patent: Jul. 13, 2021

(54) SPECTACLES DEVICE THAT CAN BE REVERSIBLY TRANSFORMED INTO A BRACELET

(71) Applicant: RENARD & MILLOT, Rennes (FR)

(72) Inventor: Christophe Millot, Rennes (FR)

(73) Assignee: RENARD & MILLOT, Rennes (FR)

( * ) Notice: Subject to any disclaimer, the term of this patent is extended or adjusted under 35 U.S.C. 154(b) by 261 days.

(21) Appl. No.: 16/466,568

(22) PCT Filed: Nov. 20, 2017

(86) PCT No.: PCT/FR2017/000214
§ 371 (c)(1),
(2) Date: Jun. 4, 2019

(87) PCT Pub. No.: WO2018/104593
PCT Pub. Date: Jun. 14, 2018

(65) Prior Publication Data
US 2020/0073141 A1      Mar. 5, 2020

(30) Foreign Application Priority Data

Dec. 9, 2016   (FR) ...................................... 1670742

(51) Int. Cl.
*G02C 3/04* (2006.01)
*A44C 5/00* (2006.01)
(Continued)

(52) U.S. Cl.
CPC .............. *G02C 3/04* (2013.01); *A44C 5/0007* (2013.01); *G02C 3/003* (2013.01); *G02C 5/006* (2013.01); *G02C 5/20* (2013.01)

(58) Field of Classification Search
CPC .......... G02C 3/04; G02C 3/003; G02C 5/006; G02C 5/20; G02C 2200/10; G02C 3/006; A44C 5/0007
See application file for complete search history.

(56) References Cited

U.S. PATENT DOCUMENTS 3,774,998 A     11/1973  Kise
4,887,896 A *  12/1989  Akagi .................... G02C 5/146
                                                                351/63

(Continued)

OTHER PUBLICATIONS

International Search Report, issued in PCT/FR2017/000214, dated Mar. 8, 2018.

*Primary Examiner* — Tuyen Tra
(74) *Attorney, Agent, or Firm* — Birch, Stewart, Kolasch & Birch, LLP

(57) ABSTRACT

A spectacles device, that can be reversibly transformed into a bracelet, includes a nose bridge, two spectacles lenses and two temple systems. Each temple system includes an inner temple and an outer temple, the inner temple being made of a shape memory material with an initial curved shape and the outer temple being made of at least one material capable of elastic deformation. The outer temple includes a first cavity, extending longitudinally, capable of allowing the inner temple to slide inside the outer temple. The outer temple also includes a second cavity capable of receiving the nose bridge and the spectacles lenses. In addition, each of the spectacle lenses is respectively attached to one end of the inner temples by a first connecting element. The nose bridge is attached to each inner temple by at least one second connecting element.

20 Claims, 5 Drawing Sheets

(51) Int. Cl.
    *G02C 3/00*     (2006.01)
    *G02C 5/00*     (2006.01)
    *G02C 5/20*     (2006.01)

(56) References Cited

U.S. PATENT DOCUMENTS

| | | | |
|---|---|---|---|
| 5,929,966 A * | 7/1999 | Conner | G02C 5/20 |
| | | | 351/118 |
| 6,783,236 B2 * | 8/2004 | Chou | G02C 5/006 |
| | | | 2/454 |
| 6,843,562 B1 | 1/2005 | Ng | |
| 9,122,075 B2 * | 9/2015 | Butler | G02C 3/04 |
| 2013/0321759 A1 | 12/2013 | Allen | |
| 2015/0338677 A1 | 11/2015 | Block | |
| 2016/0139431 A1 | 5/2016 | Sarkis | |
| 2016/0223832 A1 | 8/2016 | Hall | |

* cited by examiner

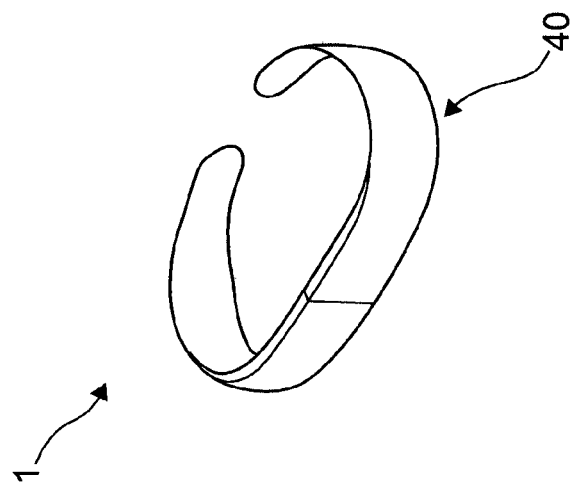
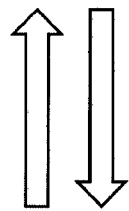
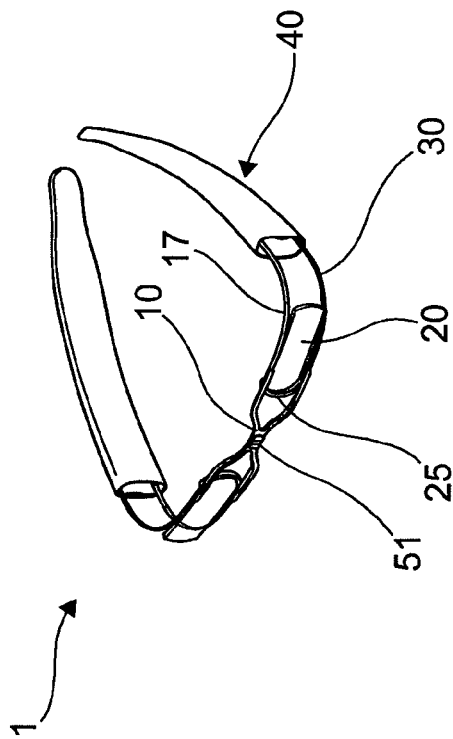
Fig. 2

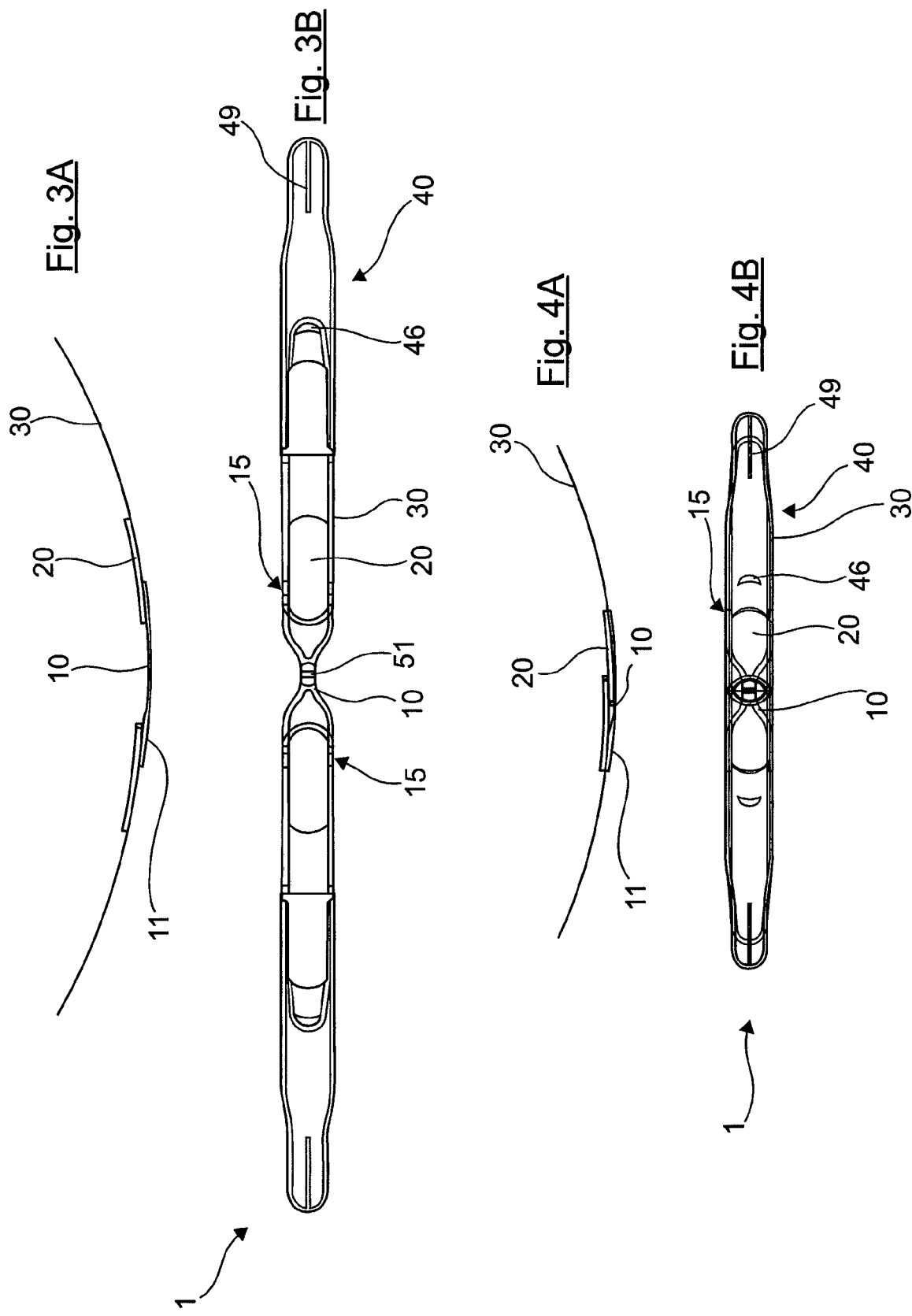

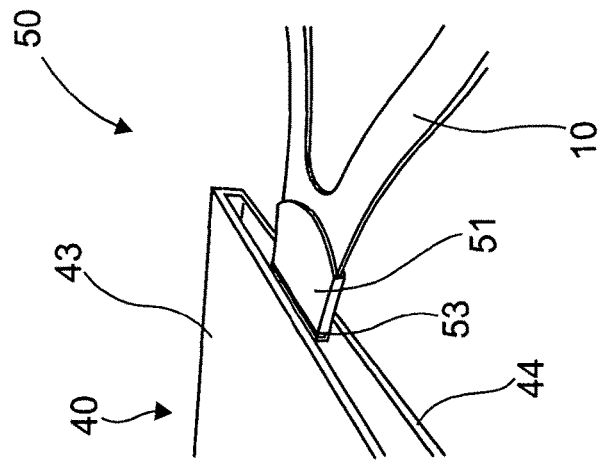
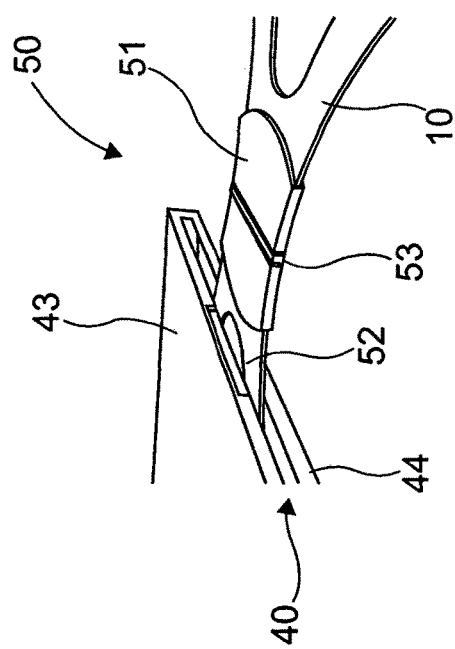
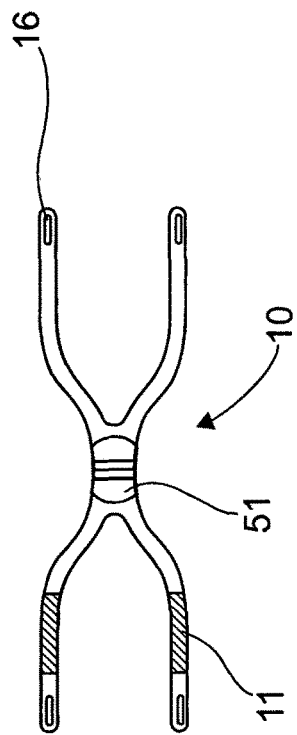
Fig. 5A
Fig. 5B
Fig. 6

SPECTACLES DEVICE THAT CAN BE REVERSIBLY TRANSFORMED INTO A BRACELET

1. FIELD OF INVENTION

The present invention concerns a kind of spectacles device that can be reversibly transformed into a bracelet.

2. PRIOR ART

Many people with presbyopia use magnifying eyeglasses for their reading needs. Such glasses are most often offered in pharmacies and at opticians. These people do not tend to wear them permanently but rather for occasional reading needs. The presbyopic reader often has an appropriate pair of spectacles which they keep available in the places they are most frequently used: desk, bedside table, pocket, etc. However, for a good number of these people, this occasional need for glasses can arise unexpectedly at any time of day, on any occasion and in any place. This is often particularly the case for busy people who do not carry a handbag or wallet during their daily activities. It is also not really practical or advisable to carry spectacles in a pocket, to wear them mounted on top of one's forehead, or attached to clothing by a temple for later use, all while ensuring that one's activity is undisturbed or without the risk of breaking the glasses.

This problem of immediate and unexpected need is partially addressed by magnifying devices that can be carried around the neck with the aid of a chain or, for compact foldable versions, placed in a pocket or, more recently, attached to a key holder. It is also possible to leave several pairs of glasses in places that the user regularly frequents (car, desk, bedside table, pocket, etc.). It is often the case that a reader without glasses must borrow some from another reader for some unforeseen reading need.

Having eyewear available at all times is not however practical enough with regard to existing equipment and the use that is made of it. The diversity of reading contexts greatly increased by the quantity of screens and interfaces that surround us, a possibly dangerous handicap created by a lack of glasses in the face of a pressing need to read and the increased mobility of individuals coupled with a wide diversity of activities requires us to think of a product that is simpler to use and better integrated with the daily life of a busy, on-the-move and ill-prepared user.

3. OBJECTIVES OF THE INVENTION

One objective of the invention is to provide a spectacles device that can be more easily and effectively protected while it is not being used.

Another objective is to offer a spectacles device that can be easily accessed and permanently available for immediate, even unforeseen, needs.

4. PRESENTATION OF THE INVENTION

The invention relates to a spectacles device that can be reversibly transformed into a bracelet comprised of a nose bridge, two spectacles lenses and two temple systems. Each temple system incorporates an inner temple and an outer temple. For each temple system, the inner temple is made from a shape memory material, having a curved initial shape, and the outer temple is made from at least one material capable of elastic deformation. The outer temple is comprised of a first cavity, extending longitudinally, adapted in order to allow the inner temple to slide inside the outer temple. The outer temple is also comprised of a second cavity capable of receiving, at least in part, the nose bridge and the spectacles lenses. Moreover, each of the spectacles lenses is respectively attached to one end of the inner temples by a first connecting element. The nose bridge is attached to each inner temple by at least one second connecting element.

The term "shape memory material" or "elastic memory material" is understood to mean a material or alloy of materials having the property of being freely deformable and then reverting to its original shape when no longer manipulated. The shape memory material according to the invention has an initial curved shape, which means that, when not subjected to any external pressure, it will revert to its initial curved form.

The term for material capable of "elastic deformation" is understood to mean a material capable of being reversibly deformed. The at least one material capable of elastic deformation according to the invention tends to deform elastically from a horizontal position to a curved position around a human limb.

Within the meaning of the invention, it is understood that a technical characteristic "markedly" has an ideal property if that technical characteristic appears to the naked eye to possess this property. Nonetheless, slight variations of the ideal property, apparent to the skilled person, are also possible.

Thanks to the temple system comprising an inner temple sliding into the first cavity of the outer temple and thanks to the second cavity of the outer temple, the device under the invention can thus be used in "spectacles mode", when the user needs it, or in a "bracelet mode" when they do not wish to use the glasses, but still wish to keep them to hand. In "spectacles mode", the temple system is unfolded: the inner temple of each temple system is for the most part outside the first cavity of the outer temple, and the spectacles lenses and nose bridge are entirely visible. The inner temple of each temple system tends to revert to its initial curved form so that it applies a light pressure to the user's face allowing the device to hold its position. In "bracelet mode", the temple system is folded away: the inner temple of each temple system is mostly, even entirely, inside the first cavity of the outer temple, and the spectacles lenses and nose bridge are mostly, even entirely, inside the second cavity of the outer temples. The spectacles lenses are thus concealed and largely, even entirely, protected by the outer temples. In "bracelet mode", the inner temples largely revert to their initial curved form.

The outer temple of each temple system also benefits from the inclusion of a preformed bistable blade. The preformed bistable blade has a first equilibrium position in which it is largely flat, and a second equilibrium position in which it is longitudinally curved. It extends longitudinally along the length of the first cavity. The preformed bistable blade benefits from only requiring a slight twist in order to switch from equilibrium position to the other and in both positions secures the rigidity of the outer temple of each temple system. The preformed bistable blade benefits from a narrowing of its width at the end furthest away from the nose bridge. In "spectacles mode", this preserves the curve of this furthest point from the nose bridge while the rest of the preformed blade is in a horizontal position and thus, assures a light pressure on the user's face so the spectacles maintain an optimal hold on the user's face. In fact, at the narrowing point, the twist for switching from one equilibrium position to the other has a slightly greater effect than that required for the rest of the preformed bistable blade.

The first connecting element is advantageously a lens holder attached to the inner temple and to the said spectacles lens. The lens holder ensures the spectacles lenses are securely held on the inner temples. It also allows the preservation of a parallelism between the spectacles lenses and the user's face when the user is wearing the device in "spectacles mode".

The inner temple of each temple system is preferentially toroidal in shape and the outer temple of each temple system incorporates a cleat projecting from the first cavity. The cleat is adapted to form an abutment with the end of the inner temple the furthest from the nose bridge. This has the particular advantage of preventing the full extraction of the inner temple from the first cavity of the outer temple.

The at least one second connecting element benefits from the inclusion of a lug at one end of the nose bridge and of a groove arranged longitudinally along the inner temple. The lug is shaped in order to be able to slide into the groove. On the one hand, this connecting element makes it possible to modify the gap between the spectacles lenses in order to adapt to different head morphologies and, on the other hand, to make the longitudinal dimension of the assembly composed of the nose bridge and the spectacles lenses smaller, allowing a reduced longitudinal dimensioning of the second cavity.

At least one cam is advantageously arranged on one side of the nose bridge. The at least one cam is adapted to allow at least partial recovering of the inner temples and spectacles lenses between them. In fact, the inner temple on the side of the nose bridge where the at least one cam is placed does not slide on the same plane as the inner temple on the cam less side of the nose bridge. This has the advantage of being able to make the longitudinal dimension of the assembly composed of the nose bridge and the spectacles lenses even smaller, allowing an even smaller longitudinal dimensioning of the second cavity.

The nose bridge benefits from being markedly in the shape of an "X". This makes it possible, in a particular mode of implementation, to fix each internal temple to the nose bridge by two second connecting elements.

The device according to the invention benefits from the inclusion of a removable fastening device between the nose bridge and each of the outer temples. The "removable" nature of the fastening device lies in the use of connecting elements, respectively arranged on the nose bridge and on each of the outer temples, capable of elastic deformation, so as to be able to move from an assembly position to a disassembly position, and vice-versa. The removable fastening device allows, depending on whether the connecting elements constituting it are assembled or, on the contrary, disassembled, the prevention or, on the contrary, the enabling of, the sliding movement between the two inner temples and the outer temples and the sliding movement between the nose bridge and the inner temples when the device according to the invention is in "bracelet mode".

The constitutional elements of the device according to the invention all benefit from having at least one axis of symmetry. In "spectacles mode", this notably facilitates the ability to position the device in any direction on the user's face.

5. LIST OF FIGURES

The invention, as well as the various advantages it presents, will be more easily understood thanks to the following description of an open-ended method of implementing it, given with reference to the drawings, in which:

FIG. 2 shows the two modes for using the device in FIG. 1.

FIGS. 3A and 3B show the device in FIG. 1 in a horizontal and fully unfolded "transition mode". FIG. 3A is an overhead view (the outer temples are not shown) while FIG. 3B is a frontal view.

FIGS. 4A and 4B show the device in FIG. 1 in a horizontal and folded-away "transition mode". FIG. 4A is an overhead view (the outer temples are not shown) while FIG. 4B is a frontal view.

FIGS. 5A and 5B show the removable fastening device between the nose bridge and the outer temple of the device in FIG. 1. FIG. 5A is in "transition mode" while FIG. 5B is in "bracelet mode".

FIG. 6 shows the nose bridge of the device in FIG. 1 in frontal view.

Figure 1:
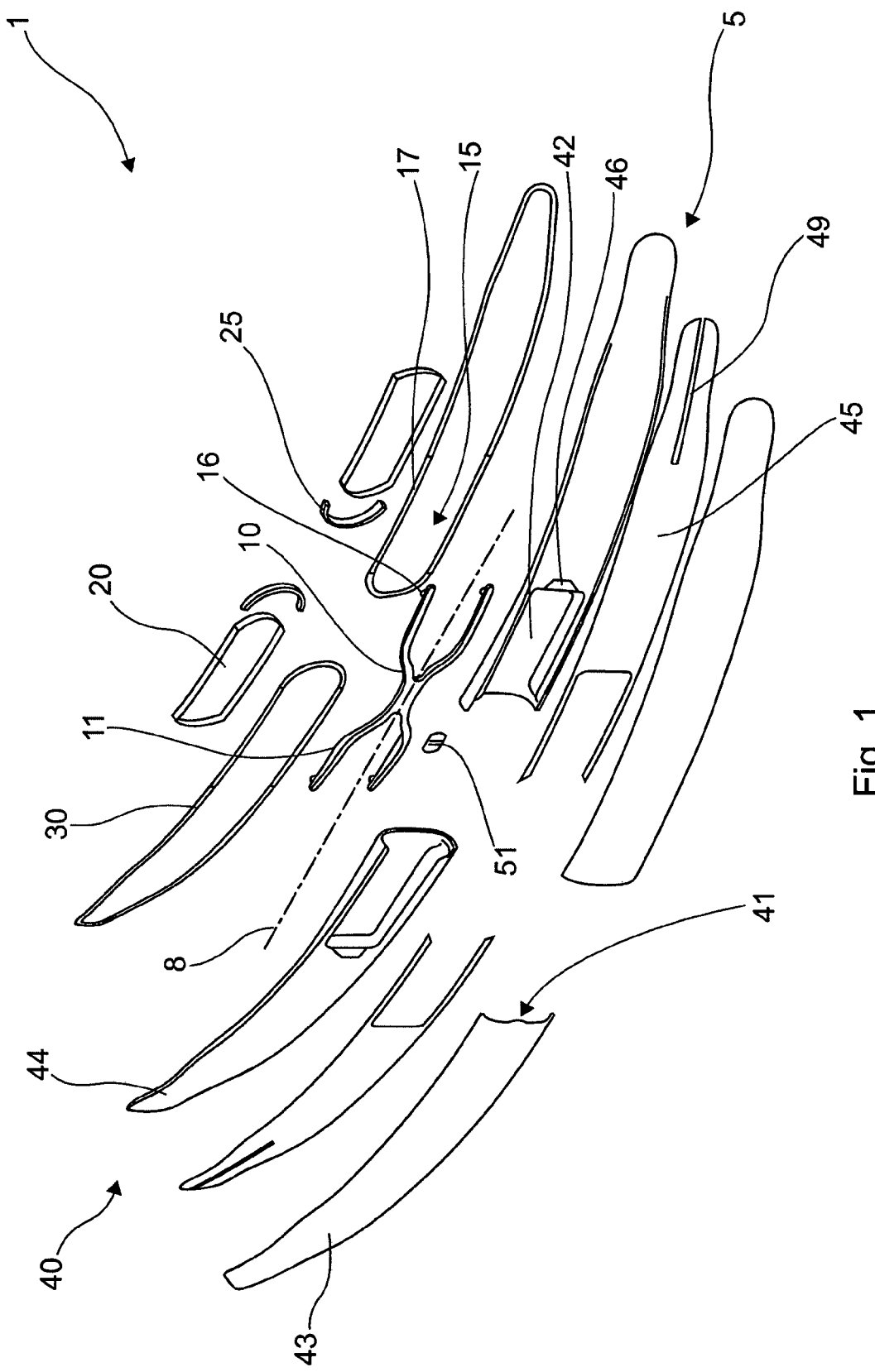
FIG. 1 shows an exploded view of the device according to the invention.
Figure 7B:
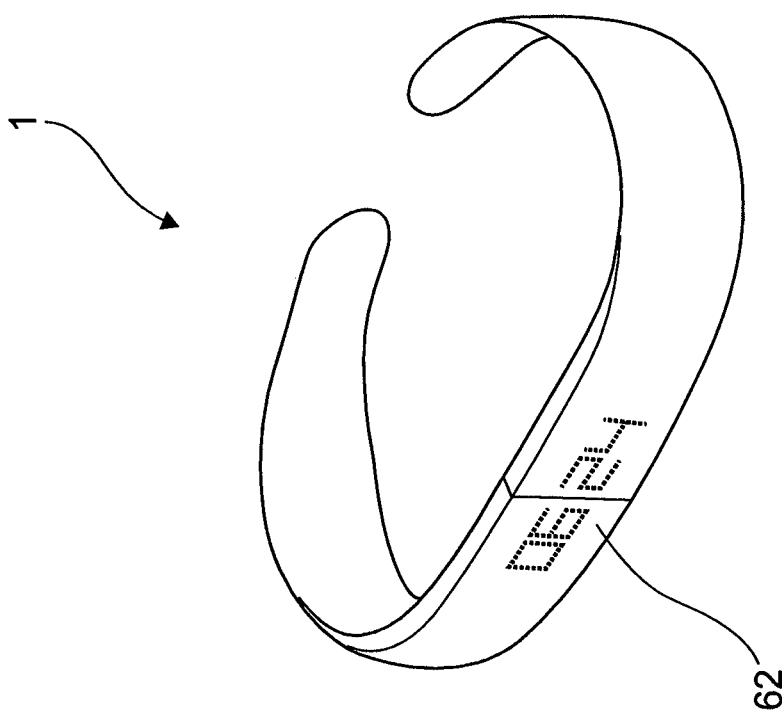
Figure 7A:
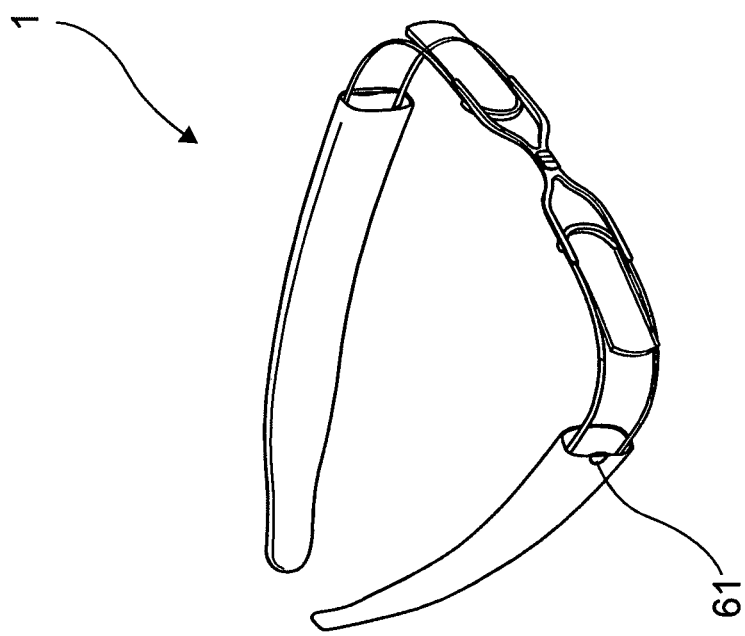

FIGS. 7A and 7B show a perspective view of the device in FIG. 1 which also includes a lighting device. FIG. 7A is a representation in "spectacles mode", the lighting device being an LED. FIG. 7B is a representation in "bracelet mode", the lighting device being a device for reading the time.

6. DETAILED DESCRIPTION OF A METHOD FOR IMPLEMENTING THE INVENTION

With reference to FIGS. 1, 2, 3A, 3B, 4, 5A, 5B and 6, the device 1 incorporates a nose bridge 10, two spectacles lenses 20 and two temple systems 5, and can be used in "spectacles mode" or transformed into "bracelet mode" via several "transition modes".

Each temple system incorporates an inner temple 30 and an outer temple 40.

For each temple system 5, the outer temple 40 incorporates an upper temple 43 and a lower temple 44, the upper and lower temples being made of silicone or any other flexible material. The upper temple 43 and/or the lower temple 44 are hollowed and joined together by heat sealing or any other assembly method. The assembly formed by the upper temple 43 and lower temple 44 includes a first cavity 41, which allows the sliding of the inner temple 30 into the outer temple 40 and second cavity 42 designed to allow all or part of the assembly formed by the nose bridge 10 and the spectacles lenses 20 to be arranged within this space. The assembly formed by the upper temple 43 and the lower temple 44 also includes a cleat 46 which projects over the first cavity 41. The cleat 46 may form part of the material used for making the upper 43 and lower 44 temples or it can be a different part, added on to the upper 43 and lower 44 temples. The cleat 46 is intended to stop the extraction of the spectacle frame at a given distance. For each temple system, the outer temple 40 also incorporates a preformed bistable blade 45, made of metal or any other adequate material. The preformed bistable blade 45 has a first equilibrium position in which it is largely flat and a second equilibrium position in which it is longitudinally curved. The performed bistable blade 45 is cut to fit between the the upper 43 and lower 44 temples, extending the length of the first cavity 41, abutting against the cleat 46 and on either side of the second cavity 42. A slit 49 is at the end of the preformed bistable blade 45. This slit 49 has the effect of maintaining a curve in this part of the preformed bistable blade 45, in this way allowing the ends of the inner temples 44 to exert pressure on the user's face to ensure the device 1 maintains an optimal hold on the face. The upper 43 and 44 lower temples are fixed to the preformed bistable blade 45: they are capable of elastic deformation alongside the deformation of the preformed bistable blade 45 in one or the other of its equilibrium positions. This is the so-called "SLAP" effect. The "SLAP effect" allows the outer temple 40 to be put into a straight or curved position through a manual action in this direction and the maintenance of the outer temple 40 in the chosen position.

From these outer temples 40, a set of the elements composing the rest of the spectacles frame, can be extracted or stored. This extraction or storage is carried out by symmetrical lateral traction or pressure on the outer temples 40. The extraction of the spectacles frame is limited by the cleat 46.

For each temple system 5, the inner temple is made from a shape memory material, which can be metal or a metal alloy or a plastic. The inter temple 30 has a toroidal shape. The inner temple 30 can be extracted from the outer temple 40 up to a certain limit, the end of the inner temple 30 the furthest from the nose bridge 10 then coming into an abutment against the cleat 46. The end of the inner temple 30 the closest to the nose bridge is recessed in order to form grooves 17.

Lens holders 25 are fixed on the inner temples 30. The lens holders 25 hold the spectacles lenses in place and conform to the shape of the end of the inner temples 30 on the side of the nose bridge 10. The lens holders 25 form a circular arc and follow the form of the inner temple 30 ends on the side of the nose bridge 10, allowing the spectacles lenses to be placed in a symmetrical position parallel to the face when the device 1 is unfolded in "spectacles mode".

The nose bridge 10 is the part that rests on the user's nose and creates the connection between the inner temples 30. The lugs 16 are arranged at the end of the nose bridge 10 and can be slid into the grooves 17 on the inner temples 30. The second connecting element 15, formed by a lug 16 which can be slid into a groove 17, allows the nose bridge 10 to be held and slid along the inner temples 30.

The nose bridge 10 is designed so that the inner temples can slide towards each other to be refolded towards the centre of the nose bridge 10. The cams 11 arranged on one side of the nose bridge 10 allow the inner temples 30, the lens holders 25 and the right and left spectacles lenses 20 to be stacked over the nose bridge 10 without the spectacles lenses touching when the device 1 is refolded. Once in this position, the user, by continuing to fold, can slide the whole of the inner temples 30 inside the outer temples 40 into the first cavity 41 until the outer temples 40 cover the spectacles lenses 20, the lens holders 25 and the nose bridge 10. Once the device 1 is completely folded away, the user can block or allow sliding movements between the inner temples 30 and outer temples 40 thanks to a removable fastening device 50. The removable fastening device 50 is comprised of a clip 51 arranged at the centre of the nose bridge 10 and of trims 52 on the ends of the upper temples 43. The clip 51 can be an integral part of the nose bridge 10 or, on the contrary, an additional piece fixed on the nose bridge 10. The trim 52 of each outer temple 40 can be attached to the clip 51 by embedding the trim 52 into a groove on clip 51. The trims 52 thus embedded into the grooves 53 of clip 51 allow the prevention of all sliding movements of the inner temples 30 in the outer temples 40 as well as any sliding movement between the nose bridge 10 and the inner temples 30 of the device 1 in "bracelet mode".

To switch from "bracelet mode" to "spectacles mode", the user's first step is to disassemble the trims 52 from clip 51. Then, for the second step, they should reset the device 1 from "bracelet mode" to a horizontal and folded away "transition mode", as shown in FIG. 4B. Then for the third step, they should exert a horizontal lateral traction towards the outside of the outer temples 40 to achieve a second horizontal and completely unfolded "transition mode", making the spectacles frame appear, as shown in FIG. 4A. This traction has the effect of extracting the inner temples 30 from the outer temples 40, then of sliding the inner temple 30 ends slide along the length of the nose bridge 10, up to a space between the spectacles lenses 20 chosen by the user in accordance with the morphology of their own face. A graduation system can be arranged on the nose bridge 10 for this purpose. The horizontal straightening of the device 1 equally has the effect of straightening the preformed bistable blades 45 and the upper 43 and lower 44 temples, which become straight and retain this position. In a final step, the user can place the nose bridge 10 of the device 1 on their nose and use the device 1 in "spectacles mode", the inner temples 30 being made of shape memory materials of a form tending "naturally" to return to their default shape, namely a curved shape. Thus, the inner temples 30 and outer temples 40 at the point of the slit 49 both exert a light pressure on the user's face, allowing an optimal hold of the device 1 "in spectacles mode" on the user's face.

With reference to FIG. 1, the nose bridge 10, the spectacles lenses 20, the upper temples 43, the lower temples 44, the preformed bistable blades 45, the lens holders 25, and the clip 51 all possess at least one horizontal axis of symmetry 8. Thus the device 1 "in spectacles mode" can be positioned in any direction on the user's face.

The device 1 according to the invention is adapted for all persons who have a specific need for eyeglasses during their activities, which does not require them to have them habitually to hand. According to the envisaged activities, the spectacles lenses 20 can be sight lenses, sunglass lenses, filter lenses, etc.

Naturally, many alternative or complementary possibilities exist for implementing the device 1 according to the invention and the method of implementation described above is no way limiting. For example, with reference to FIGS. 7A and 7B, a lighting device can be added to the device 1 according to the invention. This lighting device can be an LED 61 or a device for reading the time 62.

The invention claimed is:

1. A spectacles device that can be reversibly transformed into a bracelet, comprising:
    a nose bridge;
    two spectacles lenses; and
    two temple systems,
    wherein each temple system comprises an inner temple and an outer temple, said inner temple being formed of a shape memory material having an initial curved shape, said outer temple being made of at least one material capable of elastic deformation, said outer temple comprising:
        a first cavity, extending longitudinally, adapted to permit the sliding of said inner temple into said outer temple, and
        a second cavity, at one of the ends, adapted to receive, at least in part, said nose bridge and said spectacles lenses,
    wherein each of said spectacles lenses is fixed respectively at one end of each of the inner temples by a first connecting element, wherein said nose bridge is fixed on each inner temple by at least a second connecting element, and wherein said outer temple of each temple system is comprised of a preformed bistable blade, having a first equilibrium position in which said preformed bistable blade is largely flat and having a second equilibrium position in which said preformed bistable blade is longitudinally curved, said preformed bistable blade extending longitudinally along said first cavity.

2. The spectacles device according to claim 1, wherein said preformed bistable blade of each temple system narrows in width at the end furthest from the nose bridge.

3. The spectacles device according to claim 2, wherein said first connecting element is a lens holder attached to said inner temple and to said spectacles lenses.

4. The spectacles device according to claim 2, wherein said inner temple of each temple system is a toroidal shape and said outer temple of each temple system comprises a cleat projecting from said first cavity, said cleat being adapted to form an abutment with the end of the inner temple the furthest from the nose bridge.

5. The spectacles device according to claim 2, wherein said at least one second connecting element is composed of a lug arranged on the end of said nose bridge and a groove set longitudinally the length of said inner temple, said lug having a shape adapted to be able to slide along said groove.

6. The spectacles device according to claim 2, wherein it comprises a removable fastening device between said nose bridge and each of said outer temples.

7. The spectacles device according to claim 1, wherein said first connecting element is a lens holder attached to said inner temple and to said spectacles lenses.

8. The spectacles device according to claim 7, wherein said inner temple of each temple system is a toroidal shape and said outer temple of each temple system comprises a cleat projecting from said first cavity, said cleat being adapted to form an abutment with the end of the inner temple the furthest from the nose bridge.

9. The spectacles device according to claim 7, wherein said at least one second connecting element is composed of a lug arranged on the end of said nose bridge and a groove set longitudinally the length of said inner temple, said lug having a shape adapted to be able to slide along said groove.

10. The spectacles device according to claim 7, further comprising a removable fastening device between said nose bridge and each of said outer temples.

11. The spectacles device according to claim 1, wherein said inner temple of each temple system is a toroidal shape and said outer temple of each temple system comprises a cleat projecting from said first cavity, said cleat being adapted to form an abutment with the end of the inner temple the furthest from the nose bridge.

12. The spectacles device according to claim 11, wherein said at least one second connecting element is composed of a lug arranged on the end of said nose bridge and a groove set longitudinally the length of said inner temple, said lug having a shape adapted to be able to slide along said groove.

13. The spectacles device according to claim 11, further comprising a removable fastening device between said nose bridge and each of said outer temples.

14. The spectacles device according to claim 1, wherein said at least one second connecting element is composed of a lug arranged on the end of said nose bridge and a groove set longitudinally the length of said inner temple, said lug having a shape adapted to be able to slide along said groove.

15. The spectacles device according to claim 14, wherein at least one cam is arranged on one side of the nose bridge, said at least one cam being adapted to allow the, at least partial, covering of said inner temples and said spectacles lenses between them.

16. The spectacles device according to claim 15, wherein said nose bridge is markedly in the shape of an "X".

17. The spectacles device according to claim 15, further comprising a removable fastening device between said nose bridge and each of said outer temples.

18. The spectacles device according to claim 14, further comprising a removable fastening device between said nose bridge and each of said outer temples.

19. The spectacles device according to claim 1, further comprising a removable fastening device between said nose bridge and each of said outer temples.

20. The spectacles device according to claim 1, wherein the different constitutional elements of said device all possess at least one axis of symmetry.

* * * * *